(12) United States Patent
Vu et al.

(10) Patent No.: US 7,680,212 B2
(45) Date of Patent: Mar. 16, 2010

(54) LINEAR PRECODING FOR MULTI-INPUT SYSTEMS BASED ON CHANNEL ESTIMATE AND CHANNEL STATISTICS

(75) Inventors: Mai H. Vu, Stanford, CA (US); Arogyaswami J. Paulraj, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1152 days.

(21) Appl. No.: 11/207,175

(22) Filed: Aug. 17, 2005

(65) Prior Publication Data

US 2006/0039497 A1    Feb. 23, 2006

Related U.S. Application Data

(60) Provisional application No. 60/602,388, filed on Aug. 17, 2004.

(51) Int. Cl.
*H04L 27/04* (2006.01)
(52) U.S. Cl. .................... 375/299; 375/267; 375/296
(58) Field of Classification Search ............... 375/295, 375/299, 316, 346, 347, 349, 267, 296
See application file for complete search history.

(56) References Cited

U.S. PATENT DOCUMENTS

| | | | |
|---|---|---|---|
| 6,185,258 B1 * | 2/2001 | Alamouti et al. | 375/260 |
| 6,873,651 B2 * | 3/2005 | Tesfai et al. | 375/219 |
| 7,099,678 B2 * | 8/2006 | Vaidyanathan | 455/500 |
| 7,133,459 B2 * | 11/2006 | Onggosanusi et al. | 375/267 |
| 7,158,493 B1 * | 1/2007 | Uhlik et al. | 370/329 |
| 7,194,237 B2 * | 3/2007 | Sugar et al. | 455/39 |
| 7,206,354 B2 * | 4/2007 | Wallace et al. | 375/267 |
| 7,237,115 B1 * | 6/2007 | Thomas et al. | 713/176 |
| 7,295,636 B2 * | 11/2007 | Onggosanusi et al. | 375/346 |
| 7,298,717 B2 * | 11/2007 | Hui et al. | 370/329 |

(Continued)

OTHER PUBLICATIONS

Hemanth Sampath et al., "Linear Precoding for Space-Time Coded Systems with known Fading Correlations," IEEE Comm. Letters, vol. 6, No. 6, Jun. 2002, pp. 1-10.

(Continued)

*Primary Examiner*—Temesghen Ghebretinsae
(74) *Attorney, Agent, or Firm*—Lumen Patent Firm (57) ABSTRACT

A method, processor and system for linear precoding for a multiple-input communication channel described in terms of an effective mean and an effective correlation is provided. The effective mean and correlation can be the sample mean and correlation of the channel, or they can also include an estimate of the channel and a quality parameter of the estimate. The precode is derived by minimizing a Chernoff bound on the pairwise error probability. It is assumed the channel code is a matrix block code, which includes spatial multiplexing and space-time block codes (STBCs) as special cases. In some cases (e.g., an orthogonal STBC) the codeword separation matrix is a scaled identity matrix. In these cases, the precode that minimizes the Chernoff bound can be determined analytically. It may be necessary to perform a "dynamic water-filling" procedure in order to satisfy constraints on the optimization. In other cases, the codeword separation matrix is not a scaled identity matrix. In such cases, various precodes which approximately minimize the Chernoff bound are provided.

18 Claims, 5 Drawing Sheets

U.S. PATENT DOCUMENTS

| | | | |
|---|---|---|---|
| 7,305,055 B1* | 12/2007 | Gardner et al. | 375/347 |
| 7,327,795 B2* | 2/2008 | Oprea | 375/260 |
| 7,327,800 B2* | 2/2008 | Oprea et al. | 375/267 |
| 2001/0033622 A1* | 10/2001 | Jongren et al. | 375/267 |
| 2002/0186779 A1* | 12/2002 | Gollamudi | 375/267 |
| 2002/0196842 A1* | 12/2002 | Onggosanusi et al. | 375/148 |
| 2003/0035490 A1* | 2/2003 | Gollamudi | 375/267 |
| 2003/0043929 A1* | 3/2003 | Sampath | 375/267 |
| 2003/0063654 A1* | 4/2003 | Onggosanusi et al. | 375/130 |
| 2003/0185310 A1* | 10/2003 | Ketchum et al. | 375/259 |
| 2003/0218973 A1* | 11/2003 | Oprea et al. | 370/210 |
| 2003/0235146 A1* | 12/2003 | Wu et al. | 370/203 |
| 2004/0023621 A1* | 2/2004 | Sugar et al. | 455/103 |
| 2004/0052315 A1* | 3/2004 | Thielecke et al. | 375/299 |
| 2004/0076124 A1* | 4/2004 | Agrawal et al. | 370/310 |
| 2004/0190636 A1* | 9/2004 | Oprea | 375/260 |
| 2004/0192218 A1* | 9/2004 | Oprea | 455/73 |
| 2004/0203456 A1* | 10/2004 | Onggosanusi et al. | 455/67.13 |
| 2005/0031062 A1* | 2/2005 | Shim et al. | 375/347 |
| 2005/0032521 A1* | 2/2005 | Lee et al. | 455/450 |
| 2005/0048933 A1* | 3/2005 | Wu et al. | 455/101 |
| 2005/0063378 A1* | 3/2005 | Kadous | 370/389 |
| 2005/0068918 A1* | 3/2005 | Mantravadi et al. | 370/328 |
| 2005/0101259 A1* | 5/2005 | Tong et al. | 455/69 |
| 2005/0185728 A1* | 8/2005 | Wallace et al. | 375/267 |
| 2005/0227628 A1* | 10/2005 | Inanoglu | 455/68 |
| 2005/0286404 A1* | 12/2005 | Poon | 370/208 |
| 2006/0013250 A1* | 1/2006 | Howard et al. | 370/465 |
| 2006/0193294 A1* | 8/2006 | Jorswieck et al. | 370/334 |
| 2006/0203794 A1* | 9/2006 | Sampath et al. | 370/344 |
| 2006/0203891 A1* | 9/2006 | Sampath et al. | 375/132 |
| 2007/0058746 A1* | 3/2007 | Gueguen | 375/267 |
| 2007/0281632 A1* | 12/2007 | Poon | 455/101 |
| 2008/0101493 A1* | 5/2008 | Niu et al. | 375/267 |
| 2009/0117862 A1* | 5/2009 | Le Nir et al. | 455/101 |

OTHER PUBLICATIONS

David Gesbert et al., "From Theory to Practice: An Overview of MIMO Space-Time Coded Wireless Systems," IEEE Journal on Selected Areas in Communications, vol. 21, No. 3, Apr. 2003, pp. 281-302.

* cited by examiner

LINEAR PRECODING FOR MULTI-INPUT SYSTEMS BASED ON CHANNEL ESTIMATE AND CHANNEL STATISTICS

CROSS REFERENCE TO RELATED APPLICATIONS

This application claims the benefit of U.S. provisional patent application 60/602,388, filed Aug. 17, 2004, entitled "Linear Precoding Method for MIMO Wireless based on Channel Estimate and Channel Statistics", and hereby incorporated by reference.

FIELD OF THE INVENTION

This invention relates to communication in systems having a multiple-antenna transmitter.

BACKGROUND

Communication system design is generally concerned with maximizing information transfer from a transmitter to a receiver along a noisy channel with acceptable reliability. In practice, the channel is often time-varying (e.g., a fading channel for wireless communication) in addition to being noisy. Provision of a complete description of the channel to the transmitter, for designing the signal to increase the transmission rate and reliability, is usually difficult in practice. Various approaches have been developed for communication on time-varying channels, where differing levels of channel description are provided to the transmitter. Typically, system complexity and information transfer rate both increase as the amount and quality of channel description provided to the transmitter is improved, resulting in a performance-complexity trade-off.

Provision of a channel description to the transmitter is especially valuable in multiple transmitter antenna systems, in contrast to single antenna systems. Multi-input, multi-output (MIMO) systems (including multi-input single-output systems as a special case) commonly use space-time block codes (e.g., as considered by Alamouti et al. in U.S. Pat. No. 6,185,258). However, conventional space-time block codes do not make use of channel description. Further information on space-time coding in MIMO systems is given by Gesbert et al. in an article "From Theory to Practice: an Overview of MIMO Space-Time Coded Wireless Systems", IEEE J. Selected Areas in Communication 21(3) April 2003. Methods of utilizing channel description in multiple transmit-antenna systems, in combination with such codes, are presently under investigation, especially for wireless communication.

For example, use of a precoder derived from the channel transfer function in a MIMO system to eliminate inter-symbol interference is considered in US 2003/0235146 by Wu et al. In US 2001/0033622 by Jöngren et al., a channel description in the form of quantized feedback information is provided to the transmitter in a MIMO system and used to derive a linear precoding transformation. In US 2005/0048933 by Wu et al., a simplified feedback approach is considered, where 2(M−1) bits of feedback channel description are provided to a transmitter having M antennas in a MIMO system. Use of channel description information is sometimes known as "beamforming". Beamforming in combination with orthogonal coding is considered in US 2002/0186779 and US 2003/0035490 by Gollamudi.

In some cases, the channel description is statistical. For example, in an article entitled "Linear Precoding for Space-Time Coded Systems with Known Fading Correlations", IEEE Comm. Letters 6(6) June 2002, Sampath and Paulraj consider the use of a channel correlation matrix to derive an optimal linear precoder for a space-time coded system.

As indicated above, there is a trade-off between system performance (increasing channel description improves performance) and system complexity (increasing channel description increases complexity). In particular, approaches which attempt to provide an accurate instantaneous channel description to the transmitter are often difficult and/or complex to implement. Approaches which provide a statistical channel description to the transmitter are relatively simple to implement, but it appears that only single-parameter statistical channel descriptions (e.g., channel mean OR channel correlation) have been considered.

Accordingly, it would be an advance in the art to provide optimized linear precoding for a multi-input communication system based on a multi-parameter statistical description of the channel.

SUMMARY

The present invention provides linear precoding for a multiple-input communication channel described in terms of an effective mean and an effective correlation. The effective mean and correlation can be the sample mean and correlation of the channel, or they can also include an estimate of the channel and a quality parameter of the estimate. The precode is derived by minimizing a Chernoff bound on the pairwise error probability. It is assumed the channel code is a matrix block code, which includes spatial multiplexing and space-time block codes (STBCs) as special cases. In some cases (e.g., an orthogonal STBC) the codeword separation matrix is a scaled identity matrix. In these cases, the precode that minimizes the Chernoff bound can be determined analytically. It may be necessary to perform a "dynamic water-filling" procedure in order to satisfy constraints on the optimization. In other cases, the codeword separation matrix is not a scaled identity matrix. In such cases, various precodes which approximately minimize the Chernoff bound are provided.

DETAILED DESCRIPTION

Figure 1:
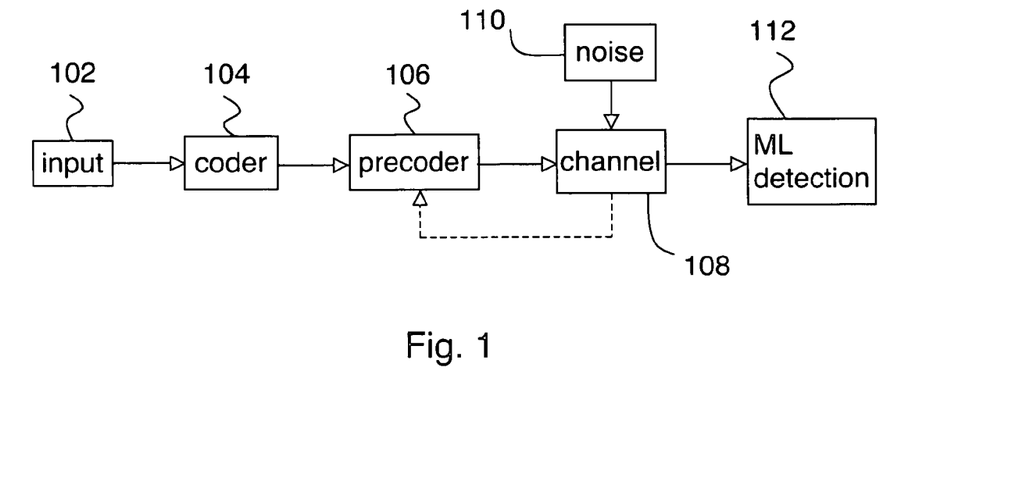
FIG. 1 shows a block diagram of a communication system according to an embodiment of the invention.

FIG. 1 shows a block diagram of a communication system (e.g., a wireless system) according to an embodiment of the invention. An input source 102 provides data bits or symbols to a coder 104. The output of coder 104 is processed by precoder 106. The output of precoder 106 is transmitted over channel 108 having additive noise 110 to receiver 112, which is assumed to perform maximum-likelihood detection of received codewords. Precoder 106 has access to statistical information relating to channel 108, as indicated on FIG. 1.

The present invention can be best appreciated in view of the following mathematical development. Let the communication system of FIG. 1 have N transmit antennas and M receive antennas. Channel 108 can then be represented as an M×N matrix H. The channel is modeled as a random matrix variable to account for its uncontrollable time-varying properties (e.g., time-selective fades). We consider channel models including effective mean and correlation parameters. More specifically, we assume a channel model given by $$H = H_E + H_w R_E^{1/2}, \quad (1)$$

where $H_E$ is the effective channel mean matrix (M×N), $R_E$ is the effective transmit correlation matrix (N×N), and $H_w$ is a complex Gaussian random matrix (M×N) with independent zero-mean, unit variance entries. The matrix $R_E$ is assumed to be invertible, while $H_E$ can have arbitrary rank.

The parameters $H_E$ and $R_E$ are provided to the transmitter. This can be done in various ways, such as feedback from the receiver and/or use of reverse channel information. For example, averaging samples $H_k$ of the channel at the receiver as follows:

$$H_m = \frac{1}{L} \sum_{k=1-L}^{0} H_k \quad (2)$$

$$R_t = \frac{1}{M} \left( \frac{1}{L} \sum_{k=1-L}^{0} H_k^* H_k - H_m^* H_m \right)$$

can provide estimates of $H_E$ and $R_E$ to the transmitter via feedback or reciprocity. More specifically, $H_E = H_m$ and $R_E = R_t$ in this example. Here an averaging window having L samples is assumed. A superscript * on a matrix denotes Hermitian conjugation throughout this description. Note that $H_m$ is a sample mean of the channel samples, and $R_t$ is a sample covariance of the channel samples. Typically, such estimates can be obtained by averaging over tens of channel coherence times and remain valid for tens to hundreds of channel coherence times.

It is also possible to include additional statistical information in the channel model of Eq. 1. More specifically, suppose an estimate $H_{est}$ of the channel and an estimate r ($0 \leq r \leq 1$) of the correlation between $H_{est}$ and the present state of the channel is available, in addition to $H_m$ and $R_t$ as given by Eq. 2. In this case, the effective mean $H_E$ and correlation $R_E$ are given by $$H_E = rH_{est} + (1-r)H_m$$

$$R_E = (1-r^2)R_t \quad (3)$$

The model of Eq. 3 approaches that of Eq. 2 as r approaches zero, as expected. As r approaches unity, $H_{est}$ is an increasingly accurate estimate of the channel state, and accordingly dominates the channel model. The estimate $H_{est}$ can be a sample of the channel.

More generally, the effective mean and transmit correlation matrices in the channel description can also be derived from an estimate $\hat{H}$ of the true channel H and the covariance of the channel estimate error $R_e$ (representing the uncertainty of the estimate and having dimensions MN×MN). Here $R_e$ is defined via $R_e = E[\hat{h}\hat{h}^* - hh^*]$, where $h = \text{vec}(H)$ and $\hat{h} = \text{vec}(\hat{H})$. The estimate $\hat{H}$ and the covariance $R_e$ depend on the channel estimation method and the characteristics of a particular channel.

For example, suppose $R_e$ can be expressed as $R_e = R_{e,t}^T \otimes I_M$, where $\otimes$ represents the matrix Kronecker product and the superscript T denotes matrix transpose. In this case, the estimate of each vector channel from all transmit antennas to a single receive antenna is correlated, but the estimates of different vector channels corresponding to different receive antennas are uncorrelated. For this example, the effective channel mean matrix $H_E$ is given by $\hat{H}$, and the effective transmit correlation matrix $R_E$ is given by $R_{e,t}$. This is an example of a case where the effective correlation matrix $R_E$ may not relate to the actual correlation between the transmit antennas.

This invention relates to the design of precoders for the above channel model. The input to precoder 106 is assumed to be an N×T matrix C (T≧1), where T is the block length of the input code. Note that the block length T can be equal to one. It is convenient to refer to input codes having this form as "matrix block codes". Matrix block codes include space-time block codes as a special case. Matrix block codes also include spatial multiplexing as a special case, where encoding is performed for each transmit antenna independently. Any combination of space-time block coding and spatial multiplexing is also included in the general category of matrix block codes.

The precoder is assumed to provide a linear transformation of its input C to the channel. Thus the input to the channel is FC, where F is the precode matrix (N×N), or precode for short. In broad terms, the problem of interest is the selection of a precode F to minimize error as inputs C are transmitted across channel H. It is assumed that the receiver performs maximum-likelihood detection to obtain a received codeword $\hat{C}$.

The error analysis is based on a Chernoff bound of the pairwise error probability (PEP). The PEP is the probability that a transmitted codeword C is erroneously decoded as another codeword $\hat{C}$, and is strongly related to system performance. It is helpful to define a codeword separation function $A(C, \hat{C})$ (N×N) as follows:

$$A(C, \hat{C}) = \frac{1}{P}(C - \hat{C})(C - \hat{C})^*, \quad (4)$$

where P is the time-average (over a block length of T) total transmitter output power. The codeword separation function $A(C, \hat{C})$ is a function of the transmitted and received codewords C and $\hat{C}$ respectively.

In order to proceed with the analysis, a design rule for selecting a separation matrix that is representative of the input code as a whole is needed. One option (referred to as the minimum-distance approach) is to set the codeword separation matrix A equal to the $A(C, \hat{C})$ function value having the minimum value of $\lambda_1(A)$ as C and $\hat{C}$ are varied. Here $\lambda_1(A)$ is the smallest non-zero eigenvalue of A. Another option is to set A equal to the expectation of $A(C, \hat{C})$, resulting in an average distance. The minimum-distance approach has the advantage of guaranteeing at least a certain amount of preceding gain, based on optimizing the error bound. Although the average-distance approach does not provide the guaranteed preceding gain of the minimum-distance approach, it does have the advantage that the resulting A matrix is more often a scaled identity matrix, which significantly simplifies the analysis. Other approaches for deriving the matrix A from the function $A(C, \hat{C})$ can also be used in practicing the invention. In the following description, the notation A is used for the codeword separation matrix.

In terms of the codeword separation matrix A, the Chernoff bound on the PEP is given by $$P(C \to \hat{C}) \leq (H, A, F) = \exp\left(-\frac{\rho}{4} tr(HFAF^*H^*)\right) \quad (5)$$

where $\rho = P/\sigma^2$ is the signal to noise ratio (SNR). In mathematical terms, the precoder design problem has been reduced to minimizing the expectation $f(H,A,F)$ by varying F, given the distribution of H (i.e., the channel description) and A (i.e., the codeword separation). The precode F is also required to satisfy the constraint $tr(FF^*)=1$, in order to conserve power.

This optimization problem for F can be expressed as the minimization of an objective function J given by $$J = tr(H_E W^{-1} H_E^*) - M \log \det(W), \text{ where} \quad (6)$$

$$W = \frac{\rho}{4} R_E F A F^* R_E + R_E \quad (7)$$

$$tr(FF^*) = 1$$

The matrix $FF^*$ is also required to be positive semi-definite (PSD). Although J is convex in W, the trace constraint on F is non-linear in F, so the problem is not convex in F. The tractability of this problem depends on the structure of the codeword separation matrix A. More specifically, the following two cases will be considered in turn: 1) A is a scaled identity matrix; and 2) A is not a scaled identity matrix.

The first case we consider is where $A=\mu I$ is a scaled identify matrix. The codeword separation matrix A will be a scaled identity matrix if the set of codewords C form an orthogonal space-time block code. In some cases, non-orthogonal space-time block codes can also lead to a scaled-identity A, (e.g., if the expectation of $A(C, \hat{C})$ or the minimum-distance $A(C, \hat{C})$ is a scaled identity matrix). In the case of spatial multiplexing, the codeword separation matrix will be a scaled identity if A is the expectation of $A(C, \hat{C})$. The parameter $\mu$ is the codeword distance. Substituting $A=\mu I$ into Eqs. 7 we have $$W = \frac{\mu \rho}{4} R_E F F^* R_E + R_E \quad (8)$$

$$\phi = FF^* = \frac{4}{\mu\rho}(R_E^{-1} W R_E^{-1} - R_E^{-1})$$

$$tr(\phi) = 1$$

where the matrix $\phi$ has been introduced for convenience.

The Lagrangian corresponding to Eqs. 6 and 8 is given by $$L(W,v,Z) = tr(H_E W^{-1} H_E^*) - M \log \det(W) + v(tr(\phi)-1) - tr(Z\phi) \quad (9)$$

where $v$ and Z are scalar and matrix Lagrange multipliers respectively. The parameter $v$ is associated with the trace constraint on $\phi$, and the parameter Z is associated with the constraint that $\phi$ be PSD. It can be shown that $Z^o$ is PSD and that $tr(Z^o \phi^o)=0$, where $Z^o$ and $\phi^o$ are the optimal values of Z and $\phi$ respectively. These conditions imply that $Z^o$ and $\phi^o$ have the same eigenvectors and have complementary eigenvalues. More specifically, if an eigenvector is associated with a non-zero eigenvalue in $\phi^o$, the corresponding eigenvalue in $Z^o$ is zero, and vice versa. Thus, at an optimal point, the term $tr(Z\phi)$ in the Lagrangian is zero.

This analysis shows that the PSD constraint on $\phi$ can be satisfied by the following general procedure: 1) first, solve for $\phi$ assuming $\phi$ is full-rank and ignoring the Z term in Eq. 9; 2) if the resulting $\phi$ is not PSD, force the most negative eigenvalue of $\phi$ to be zero and re-solve; 3) repeat step 2 as needed until the resulting $\phi$ is PSD. This procedure is referred to as dynamic water-filling because at each iteration the mode directions change as does the power distribution among modes. In contrast, conventional water-filling relates to varying the power distributed to a set of modes having fixed direction.

Differentiating the Lagrangian with respect to W and requiring the result to be zero leads to a matrix quadratic equation having the following solution for $\phi$:

$$\phi = \frac{4}{\mu\rho}\left(\frac{1}{2v}(MI_N + \psi^{1/2}) - R_E^{-1}\right) \quad (10)$$

$$\psi = M^2 I_N + 4v R_E^{-1} H_E^* H_E R_E^{-1}$$

where $v$ is determined numerically to satisfy the trace constraint in Eqs. 8. Let $\phi$ have the following eigenvalue decomposition:

$$\phi = U \Lambda U^*, \quad (11)$$

where $\Lambda$ is a diagonal matrix of eigenvalues and U is unitary. The precode F is then given by $$F = U \Lambda^{1/2} V^*, \quad (12)$$

where V is an arbitrary unitary matrix (N×N). In this case (i.e., A is a scaled identity matrix), setting V=I is a convenient choice.

The numerical solution for $v$ proceeds as indicated above. First it is assumed that $\phi$ is full-rank. The trace condition can be expressed as $$tr\left(\frac{1}{2v}(MI_N + \psi^{1/2}) - R_E^{-1}\right) = \frac{\mu\rho}{4}. \quad (13)$$

Numerical solution of Eq. 13 for $v$ is expedited by making use of the following bounds on $v$: $v_l \leq v \leq v_u$, where $$v_l = \frac{N^2 \lambda_1}{\beta_0^2} + \frac{MN}{\beta_0}, \quad v_u = \frac{N \alpha_0}{\beta_0^2} + \frac{MN}{\beta_0}, \quad (14)$$

-continued $$\alpha_0 = tr(R_E^{-1} H_E^* H_E R_E^{-1}), \lambda_1 = \lambda_{min}(R_E^{-1} H_E^* H_E R_E^{-1}), \text{ and}$$

$$\beta_0 = tr(R_E^{-1}) + \mu\rho/4.$$

Numerical solution for $v$ (e.g., using a binary search method between these two bounds) typically proceeds rapidly, since the problem is one-dimensional and bounded.

If $\phi$ as given by Eqs. 10 is not PSD when $v$ as determined from Eq. 13 is substituted in, then a mode has to be dropped. Mode dropping is repeated, one mode at a time, until the resulting $\phi$ is PSD. The condition on $v$ for k modes dropped is given by $$\sum_{i=k+1}^{N} \lambda_i \left( \frac{1}{2v}(MI_N + \psi^{1/2}) - R_E^{-1} \right) = \frac{\mu\rho}{4} \quad (15)$$

where $\lambda_i(M)$ is the ith eigenvalue of M, sorted into increasing order (i.e., $\lambda_1 \leq \lambda_2 \leq \ldots \leq \lambda_N$). The corresponding $\phi$ matrix is given by $$\phi = \frac{4}{\mu\rho} drop_k \left( \frac{1}{2v}(MI_N + \psi^{1/2}) - R_E^{-1} \right), \quad (16)$$

where $drop_k(M) = U_M \Lambda_{drop} U_M^*$ for M having an eigenvalue decomposition $M = U_M \Lambda_M U_M^*$. Here $\Lambda_{drop}$ is obtained from $\Lambda_M$ by setting the k smallest eigenvalues of $\Lambda_M$ to zero. Dynamic water filling begins by setting k=1 in Eqs. 15 and 16 and solving. If the $\phi$ of Eq. 16 is PSD, the process terminates. If $\phi$ is not PSD, k is incremented by one and Eqs. 15 and 16 are re-solved. The number of dropped modes k is incremented by one as needed until $\phi$ of Eq. 16 becomes PSD.

The numerical solution of Eq. 15 at each state of dynamic water filling is expedited by making use of the following bounds on $v$: $v_l \leq v \leq v_u$, where $$v_l = \frac{\lambda_1}{\beta_k^2} + \frac{M}{\beta_k}, \quad (17)$$

$$v_u = \frac{\lambda_N}{\beta_k^2} + \frac{M}{\beta_k}, \text{ and}$$

$$\lambda_1 = \lambda_{min}(R_E^{-1} H_E^* H_E R_E^{-1}), \quad (18)$$

$$\lambda_N = \lambda_{max}(R_E^{-1} H_E^* H_E R_E^{-1}),$$

$$\beta_k = \frac{1}{N-k} \left( \frac{\mu\rho}{4} + \sum_{i=k+1}^{N} \frac{1}{\lambda_i(R_E)} \right),$$

with $\lambda_i(R_E)$ sorted in increasing order. Here also, numerical solution (e.g., using a binary search method between these two bounds) for $v$ typically proceeds rapidly, since the problem is one-dimensional and bounded.

The above development of Eqs. 8-18 relates to the case where the codeword separation matrix A is a scaled identity matrix distance. Now we consider the case where A is not a scaled identity matrix. More specifically, A can be an arbitrary PSD matrix. In this situation, it is helpful to temporarily introduce an additional constraint to the optimization problem of Eqs. 6 and 7. More specifically, we consider the problem:

$$J = tr(H_E W^{-1} H_E^*) - M \log\det(W)$$

$$tr(FF^*) = 1$$

$$tr(FAF^*) = \gamma \quad (19)$$

where the $\gamma$ constraint ($\gamma > 0$) is the temporary additional constraint. Consideration of this extra constraint will lead to a partial solution to the original problem. We begin with the observation that the problem of Eqs. 19 can be made equivalent to the original problem if $\gamma$ is allowed to vary over all values (effectively removing the constraint). Furthermore, the $\gamma$ constraint acts as a power constraint, so the largest feasible value of $\gamma$ will be optimal for minimizing J. The parameter $\gamma$ is maximized when $F^*F$ and A have the same eigenvectors. Let the singular value decomposition (SVD) of F be given by $F = UDV^*$. Let the eigenvalue decomposition of A be given by $A = U_A \Lambda_A U_A^*$. The parameter $\gamma$ is maximized by setting $V = U_A$ in the SVD of F. By maximizing $\gamma$ in this way, the problem of Eqs. 19 is made equivalent to the original problem of Eqs. 6 and 7. The result of these considerations is that the V matrix in the SVD of F is determined and must equal $U_A$, in contrast to the $A = \mu I$ case, where V is undetermined.

The optimization problem of Eqs. 19 can be expressed as $$J = tr(H_E W^{-1} H_E^*) - M \log \det(W) \quad (20)$$

$$\sum_i \xi_i \lambda_i(B) = 1$$

$$B = FAF^*$$

where B is PSD, $\xi_i = 1/\lambda_i(A)$ and the sum runs over the non-zero eigenvalues of A.

Unfortunately, the optimization problem of Eqs. 20 is not convex in B, because of the non-linear constraint on the eigenvalues of B. Accordingly, solutions to optimization problems which approximate that of Eqs. 20 are of interest. One possibility is to replace all $\xi_i$ in Eqs. 20 with $\xi_{max}$, which is equivalent to approximating A as a scaled identity matrix with $\mu$ taken to be the minimum non-zero eigenvalue of A. This approximation can be performed in two different ways. The first way is to compute an expectation codeword separation matrix A and set the codeword distance $\mu$ to be the minimum non-zero eigenvalue of this A. The second way is to set the codeword distance $\mu$ to be the minimum non-zero eigenvalue of $A(C, \hat{C})$ as C and $\hat{C}$ vary over all distinct pairs of codewords. In either case, once the codeword distance $\mu$ is defined, the $A = \mu I$ formalism of Eqs. 8-18 is applicable, except that $V = U_A$ is required in the SVD of F as indicated below Eqs. 19. The resulting precode F should be reasonable, although sub-optimal, for this more general case. This approach tends to work well when the condition number of A is reasonably small.

An alternative approximation for Eqs. 20 is to consider $$J = tr(H_E W^{-1} H_E^*) - M \log\det(W)$$

$$tr(\Lambda_A^{-1} B) = 1 \quad (21)$$

where the trace constraint on B is linear, making the problem convex. Solutions to this problem may provide solutions having $tr(FF^*) < 1$. In such case, a scaling factor can be applied to F to force the trace to be unity. The solution to the optimization problem of Eqs. 21 is similar to the solution described above in connection with the A=μI case, so the description here is correspondingly briefer.

The solution for B is given by $$B = \frac{4}{\rho}\left(\frac{1}{2\nu}R_E^{-1}G(MI_N + \psi^{1/2})GR_E^{-1} - R_E^{-1}\right), \text{ where} \quad (22)$$

$$\psi = M^2 I_N + 4\nu G^{-1} H_E^* H_E G^{-1} \quad (23)$$

$$G^2 = R_E \Lambda_A R_E$$

G is Hermitian, and ν is the numerically determined Lagrange multiplier.

Let B have the following eigenvalue decomposition:

$$B = U_B \Lambda_B U^*_B, \quad (24)$$

where $\Lambda_B$ is a diagonal matrix of eigenvalues and $U_B$ is unitary. The precode F is then given by $$F = U_B \Lambda_B^{1/2} \Lambda_A^{-1/2} U^*_A. \quad (25)$$

Note that the undetermined V matrix of Eq. 12 is not present in this case.

The Lagrange multiplier ν is determined by solving the following equation $$\sum_{i=1+1}^{N} \lambda_i \left(\frac{M}{2\nu}I_N + \frac{1}{2\nu}\Lambda_A^{-1}R_E^{-1}G\psi^{1/2}GR_E^{-1} - \Lambda_A^{-1}R_E^{-1}\right) = \frac{\rho}{4}, \quad (26)$$

where k is the number of dropped modes for dynamic waterfilling. The process starts by solving the k=0 equation. If the resulting B is PSD, the method terminates. If the resulting B is not PSD, k is incremented by one and the problem is re-solved. This step is repeated until the corresponding B is PSD. Numerical solution of Eq. 26 is expedited by making use of the following bounds on ν: $\nu_l \leq \nu \leq \nu_u$, where $$\nu_l = \frac{\alpha_l}{\beta_l^2} + \frac{M}{\beta_l}, \quad (27)$$

$$\nu_u = \frac{\alpha_u}{\beta_u^2} + \frac{M}{\beta_u}, \text{ and}$$

$$\alpha_u = \lambda_{max}(G^{-1}H_E^* H_E G^{-1}), \quad (28)$$

$$\alpha_l = \lambda_{min}(G^{-1}H_E^* H_E G^{-1}),$$

$$\beta_u = \lambda_{min}(\Lambda_A^{-1}R_E^{-1}) + \frac{\rho}{4(N-k)},$$

$$\beta_l = \lambda_{max}(\Lambda_A^{-1}R_E^{-1}) + \frac{\rho}{4(N-k)}.$$

The preceding description relates to several methods of deriving precoders according to embodiments of the invention. Various approaches can be employed for implementing these methods. In general terms, a processor is required to determine the precode F in terms of the code and channel parameters as described above. Such a processor can be implemented in any combination of hardware and/or software. The processor can be included in the transmitter or receiver of a communication system, but a location in the receiver can be more convenient since channel information is typically most readily available at the receiver. The processor can also be a separate component (e.g., an add-on to an existing system architecture), although this configuration is less common. The processor can also be distributed over two or more separated locations (e.g., transmitter and receiver). The processor can provide or receive the channel information (i.e., $H_E$ and $R_E$) needed to derive the precode.

Figure 2:
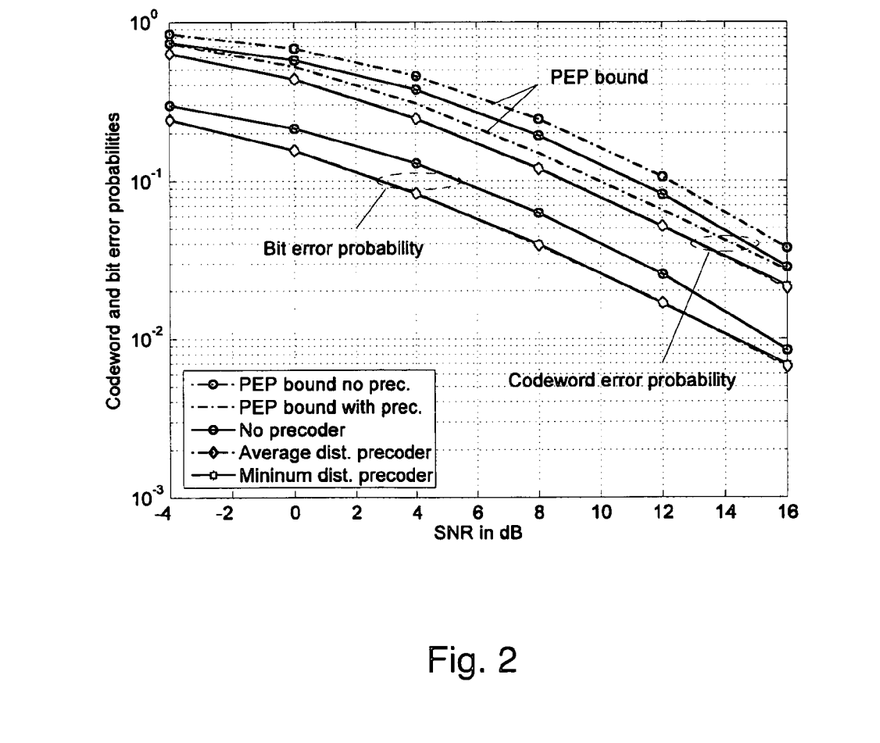
FIG. 2 shows results from an example of precoding according to the invention in a 2×1 system using the Alamouti code with QPSK modulation.
Figure 3:
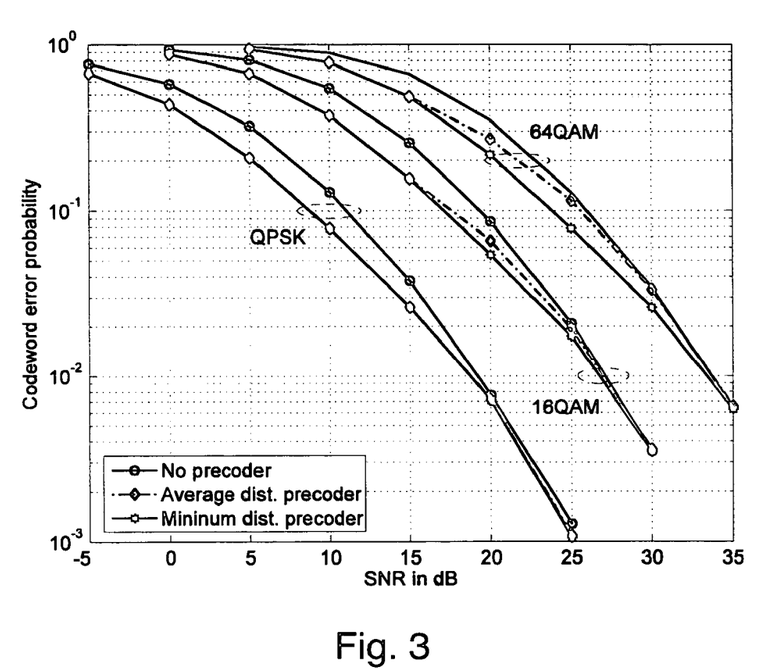
FIG. 3 shows results from an example of precoding according to the invention in a 2×1 system using the Alamouti code with 3 different modulations: QPSK, 16QAM, and 64QAM.

FIGS. 2-9 show results from various examples of preceding according to embodiments of the invention. FIG. 2 shows an example where preceding according to the invention is applied to the case of the orthogonal Alamouti space-time block code using QPSK modulation for a 2×1 system. For this example, the minimum distance and average distance approaches perform identically. The preceding gain is about 2.2 dB at low and medium SNRs and diminishes at higher SNR. FIG. 3 shows the performance of the same system as FIG. 2 for several QAM orders. The preceding gain of the minimum-distance approach is consistent as QAM constellation size varies, while the average distance approach provides less preceding gain for large constellations at high SNR. As constellation size increases, the number of minimum distance codeword pairs increases. As SNR increases, minimum distance codeword pairs tend to dominate the overall error probability. For these reasons, the minimum distance approach provides improved performance compared to the average distance approach in the high SNR, large constellation domain, and is accordingly preferred in this domain.

Figure 4:
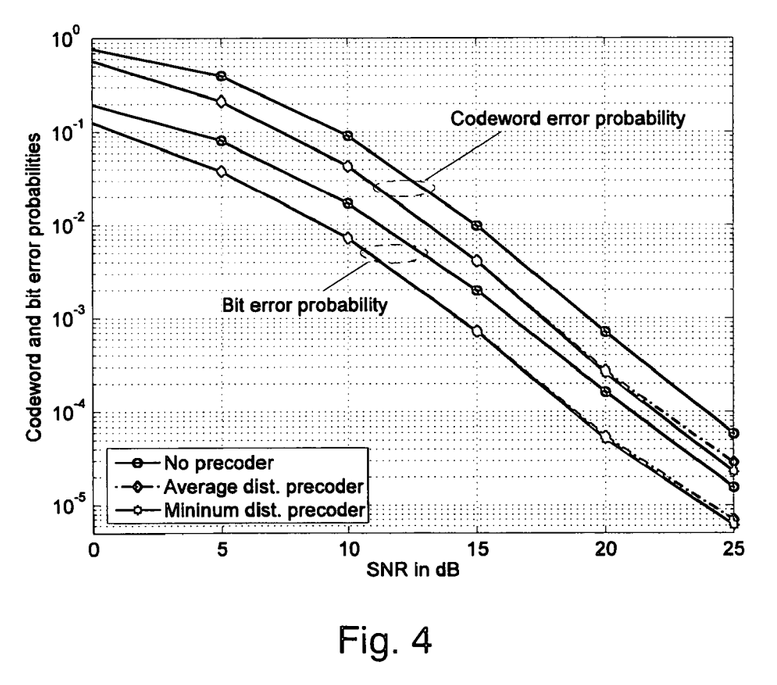
FIG. 4 shows results from an example of precoding according to the invention in a 4×1 system using a non-orthogonal block code and QPSK.
Figure 5:
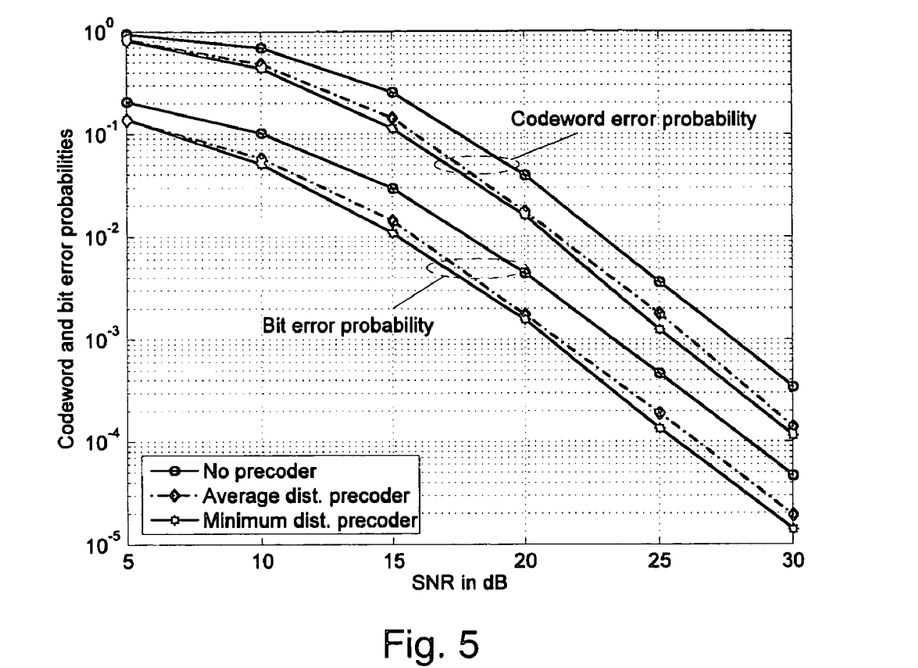
FIG. 5 shows results from an example of precoding according to the invention in a 4×1 system using a non-orthogonal block code and 16QAM.

FIG. 4 shows an example where preceding according to the invention is applied to the case of a non-orthogonal space-time block code using QPSK modulation for a 4×1 system. The code of this example is a quasi-orthogonal space-time block code, and it turns out for this code that A is a scaled identity matrix for both the minimum distance and average distance approaches. In this example, the performance of the minimum-distance and average-distance approaches is similar, with a preceding gain of about 1.7 to 2 dB. FIG. 5 shows the performance of the same system as FIG. 4, except that 16QAM modulation with Gray bit-mapping is employed. In this case, the minimum-distance precoder performs slightly better than the average distance precoder (by about 0.5 dB). This is attributed to the high SNR/large constellation effect as discussed in connection with FIG. 3. The preceding gain of the minimum-distance precoder in the example of FIG. 5 is around 1.8 to 2.5 dB.

Figure 6:
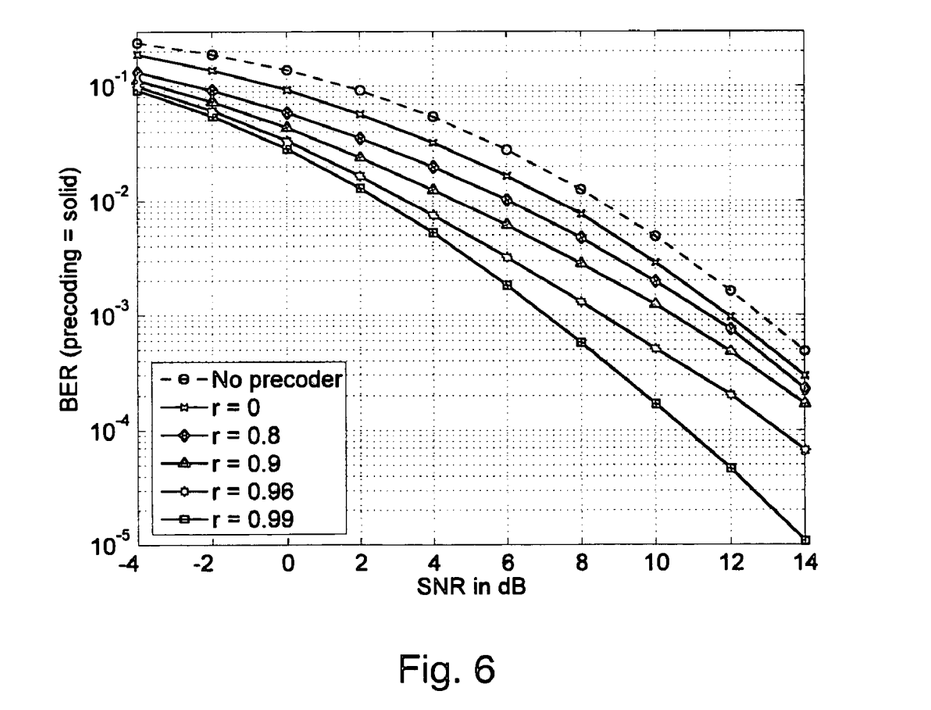
FIG. 6 shows results from an example of precoding according to the invention in a 4×1 system for varying levels of channel estimate quality at the transmitter.

FIG. 6 shows the effect of including a channel estimate $H_{est}$ in the effective channel mean and correlation matrices as in Eqs. 3. For the example of FIGS. 6-8, the system is taken to be a 4×1 system having an orthogonal space-time block code with QPSK modulation. FIG. 6 shows the effect of the channel estimate on performance. When r=1, the transmitter has perfect information about the state of the channel, and can exploit this information to provide 6 dB of gain. When r=0, the estimate is useless, but preceding based on statistical channel information provides a useful preceding gain. For intermediate values of r, the performance falls between these two extremes, as expected.

Figure 7:
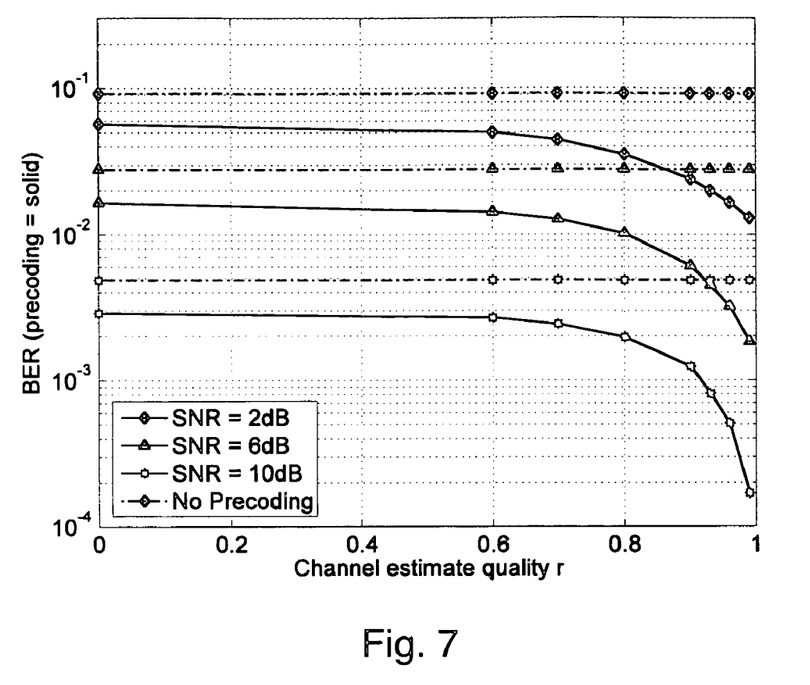
FIG. 7 shows results from an example of performance vs. channel estimate quality for an embodiment of the invention.

FIG. 7 plots the performance as a function of the estimate quality r. From this plot, it is evident that for r<0.6, preceding based on channel statistics alone can provide most of the available gain. The correlation r needs to be greater than about 0.6 (in this particular example) in order for use of the estimate to provide significant additional precoding gain.

Figure 8:
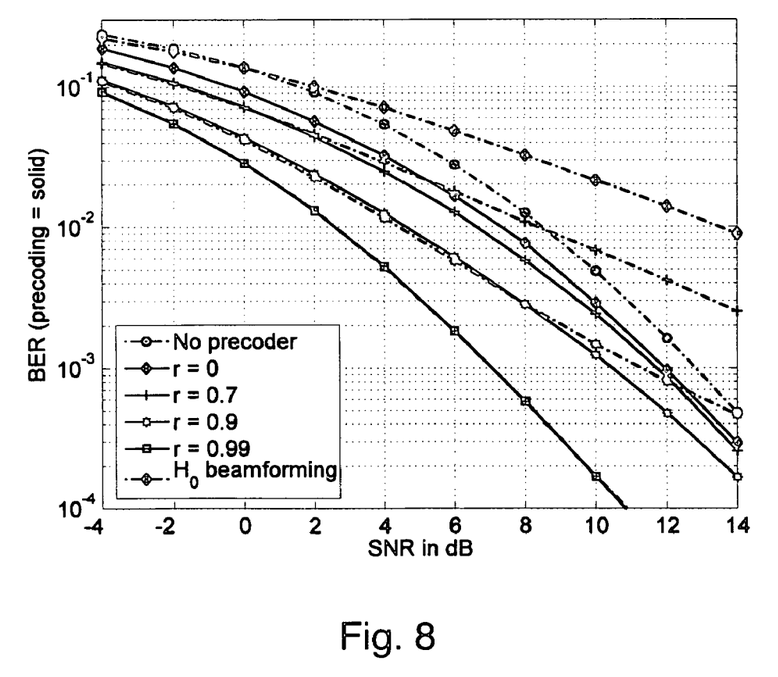
FIG. 8 shows a performance comparison between precoding according to the invention and beamforming based on an outdated channel measurement.

FIG. 8 shows a comparison of precoding according to the present invention using the approach of Eqs. 3 compared to naive beam-forming based on an initial estimate of the channel $H_0$ which is never updated. The $H_0$ approach fails badly at high SNR, and eventually performs worse than no preceding at all. In contrast, the approach of Eqs. 3 above is robust in the sense that it always performs better than no preceding at all.

Figure 9:
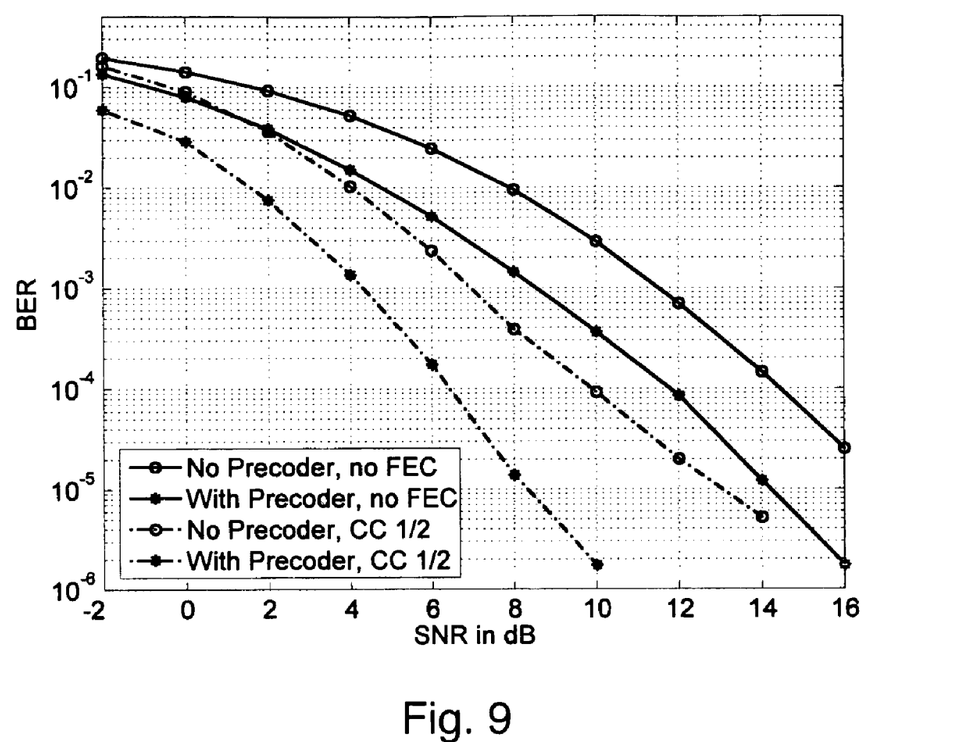
FIG. 9 shows an example of precoding according to the invention in combination with a error correction code and a space-time block code.

FIG. 9 shows an example where precoding according to an embodiment of the invention is used in combination with an error correction code and a space-time block code. In general, the invention can be practiced with or without the use of an error correction code in addition to the matrix block code. In the example of FIG. 9, the quasi-orthogonal space-time block code of FIG. 4 is employed in a 4×2 system with QPSK modulation, and the error correction code is a rate ½ convolutional code having a generator matrix G=[133, 171] in octave.

The invention claimed is:

1. A method for transmitting information comprising:
providing a communication system including a transmitter having two or more transmit antennas and a receiver having one or more receive antennas, wherein a channel between the transmitter and the receiver has a non-zero effective mean matrix;
providing an estimate of the effective channel mean matrix;
providing an estimate of an effective transmit correlation matrix of the transmit antennas;
deriving a linear precode for the channel based in part on the estimates of the effective channel mean matrix and the effective transmit correlation matrix;
encoding information to be transmitted according to the linear precode;
wherein a matrix block code is provided for said channel, the matrix block code comprising a code selected from the group consisting of: orthogonal space-time block codes, non-orthogonal space-time block codes, and spatial multiplexing codes;
wherein a codeword C is a codeword of said matrix block code and a codeword $\hat{C}$ is another codeword of said matrix block code, wherein said matrix block code has a codeword product separation function $A(C, \hat{C})$ of said codewords C and $\hat{C}$.

2. The method of claim 1, wherein said providing an estimate of the effective channel mean matrix comprises providing a sample mean of channel samples within an averaging window, and wherein said providing an estimate of the effective transmit correlation matrix comprises providing a sample covariance of the channel samples.

3. The method of claim 1 further comprising:
providing a channel estimate $H_{est}$ which is a sample of the channel;
providing an estimate of a correlation r between $H_{est}$ and the channel;
providing a channel mean matrix $H_m$ given by a sample mean of channel samples within an averaging window;
providing a channel transmit correlation matrix $R_t$ given by a sample covariance of the channel samples;
wherein said estimate of the effective channel mean matrix is given by $rH_{est}+(1-r)H_m$;
wherein said estimate of the effective transmit correlation matrix is given by $(1-r^2)R_t$.

4. The method of claim 1, wherein a codeword product separation matrix A is derived from said separation function $A(C, \hat{C})$.

5. The method of claim 4, wherein said separation matrix A is a value of said separation function having a minimum $\lambda_1(A)$, where $\lambda_1(A)$ is the smallest non-zero eigenvalue of A.

6. The method of claim 4, wherein said separation matrix A is an expectation of said separation function.

7. The method of claim 4, wherein said separation matrix $A=\mu I$ where I is an identity matrix and $\mu$ is a codeword distance.

8. The method of claim 7, wherein said system has a signal to noise ratio $\rho$, wherein said system has N transmit antennas and M receive antennas, wherein said channel has an effective mean matrix $H_E$ and an effective transmit correlation matrix $R_E$, wherein $v$ is a numerically determined Lagrange multiplier, wherein $I_N$ is an N+N identity matrix;
wherein a matrix $\psi = M^2 I_N + 4v R_E^{-1} H^*_E H_E R_E^{-1}$;
wherein a matrix $$\phi = \left[\frac{1}{2v}(MI_N + \psi^{1/2}) - R_E^{-1}\right]\frac{4}{\mu\rho},$$

wherein $\phi$ has an eigenvalue decomposition given by $\phi=U\Lambda U^*$ where $\Lambda$ is a diagonal matrix of eigenvalues of $\phi$, and U is unitary;
wherein $v$ is selected such that $tr(\phi)=1$; and
wherein said linear precode has a matrix representation F given by $F=U\Lambda^{1/2}V^*$, where V is an arbitrary unitary matrix.

9. The method of claim 8, wherein negative eigenvalues of $\phi$ are forced to be equal to zero to ensure $\phi$ is positive semi-definite.

10. The method of claim 4, wherein said separation matrix A is not a scalar multiple of an identity matrix.

11. The method of claim 10, wherein a codeword distance $\mu$ is a minimum non-zero eigenvalue of A.

12. The method of claim 10, wherein a codeword distance $\mu$ is an expectation of a minimum non-zero eigenvalue of said separation function $A(C, \hat{C})$.

13. The method of claim 10, wherein said linear precode has a singular value decomposition given by $F=UDV^*$, and wherein A has an eigenvalue decomposition $A=U_A\Lambda_A U_A^*$, and wherein $V=U_A$.

14. The method of claim 13, wherein said system has a signal to noise ratio $\rho$, wherein said system has N transmit antennas and M receive antennas, wherein said channel has an effective mean matrix $H_E$ and an effective transmit correlation matrix $R_E$, wherein $v$ is a numerically determined Lagrange multiplier, wherein $I_N$ is an N×N identity matrix;
wherein a Hermitian matrix G satisfies $G^2=R_E\Lambda_A R_E$;
wherein a matrix $\psi=M^2 I_N+4vG^{-1}H^*_E H_E G^{-1}$;
wherein a matrix $$B = \frac{4}{\rho}\left[\frac{1}{2v}R_E^{-1}G(MI_N + \psi^{1/2})GR_E^{-1} - R_E^{-1}\right],$$

wherein B has an eigenvalue decomposition given by $B=U_B\Lambda_B U_B^*$ where $\Lambda_B$ is a diagonal matrix of eigenvalues of B and $U_B$ is unitary;
wherein $v$ is selected such that $tr(\Lambda_A^{-1}B)=1$; and
wherein said linear precode has a matrix representation F given by $F=U_B\Lambda_B^{1/2}\Lambda_A^{-1/2}U^*_A$.

15. The method of claim 14, wherein negative eigenvalues of B are forced to be equal to zero in order to ensure B is positive semi-definite.

16. The method of claim 13, wherein said system has a signal to noise ratio $\rho$, wherein said system has N transmit antennas and M receive antennas, wherein said channel has an effective mean matrix $H_E$ and an effective transmit correlation matrix $R_E$, wherein $\mu$ is a codeword distance, wherein $v$ is a numerically determined Lagrange multiplier, wherein $I_N$ is an N×N identity matrix;
wherein a matrix $\psi=M^2 I_N+4vR_E^{-1}H^*_E H_E R_E^{-1}$;
wherein a matrix $$\phi = \left[\frac{1}{2\nu}(MI_N + \psi^{1/2}) - R_E^1\right]\frac{4}{\mu\rho},$$

wherein $\phi$ has an eigenvalue decomposition given by $\phi=U\Lambda U^*$ where $\Lambda$ is a diagonal matrix of eigenvalues of $\phi$, and U is unitary;

wherein $\nu$ is selected such that $tr(\phi)=1$; and wherein said linear precode has a matrix representation F given by $F=U\Lambda^{1/2}U_A^*$.

17. The method of claim 16, wherein negative eigenvalues of $\phi$ are forced to be equal to zero to ensure $\phi$ is positive semi-definite.

18. The method of claim 1, wherein said deriving comprises:
 a) performing an initial optimization assuming power is allocated to all precoder modes;
 b) if any mode has a negative eigenvalue, removing the mode having the most negative eigenvalue to provide a reduced set of modes;
 c) recalculating the optimization assuming power is allocated to the reduced set of modes, if a mode is removed in step (b); and
 d) repeating steps (b) and (c) until no mode has a negative eigenvalue.

* * * * *